(12) United States Patent
Lin et al.

(10) Patent No.: US 10,234,107 B2
(45) Date of Patent: Mar. 19, 2019

(54) PROJECTING LAMP STRUCTURE HAVING LIGHT ADJUSTING DEVICE

(71) Applicant: AREX(TWN) INTERNATIONAL CO., LTD., New Taipei (TW)

(72) Inventors: Yuh-sheng Lin, New Taipei (TW); Chin-hung Lin, Keelung (TW); Che-chun Chang, New Taipei (TW)

(73) Assignee: AREX(TWN) INTERNATIONAL CO., LTD., New Taipei (TW)

( * ) Notice: Subject to any disclaimer, the term of this patent is extended or adjusted under 35 U.S.C. 154(b) by 0 days.

(21) Appl. No.: 15/644,786

(22) Filed: Jul. 9, 2017

(65) Prior Publication Data
US 2018/0313522 A1  Nov. 1, 2018

(30) Foreign Application Priority Data
Apr. 26, 2017 (TW) .............................. 106205839 U

(51) Int. Cl.
| F21V 5/04 | (2006.01) |
| F21V 5/08 | (2006.01) |
| F21V 14/08 | (2006.01) |
| F21V 11/00 | (2015.01) |
| F21V 19/00 | (2006.01) |
| F21V 11/08 | (2006.01) |
| F21Y 115/10 | (2016.01) |

(52) U.S. Cl.
CPC ................ *F21V 14/08* (2013.01); *F21V 5/04* (2013.01); *F21V 5/08* (2013.01); *F21V 11/00* (2013.01); *F21V 11/08* (2013.01); *F21V 19/0015* (2013.01); *F21Y 2115/10* (2016.08)

(58) Field of Classification Search
CPC ........ F21V 14/08; F21V 19/0015; F21V 5/04; F21V 11/00; F21V 5/08; F21V 11/08; F21Y 2115/10
See application file for complete search history.

(56) References Cited

U.S. PATENT DOCUMENTS

2009/0268471 A1* 10/2009 Chen .......................... F21K 9/00
362/335
2012/0113621 A1*  5/2012 Lee .......................... H01L 33/54
362/97.1

* cited by examiner

*Primary Examiner* — Sonji N Johnson
(74) *Attorney, Agent, or Firm* — Mark M. Friedman

(57) ABSTRACT

A projecting lamp structure having a light adjusting device is provided. The projecting lamp structure includes a light source disposed on a circuit board and configured to provide light rays. A lens having an asymmetrical bat-wing candle power distribution is disposed on the circuit board, wherein the lens is configured to receive the light rays and emits the light rays. A light adjusting device is disposed on the circuit board and surrounding the lens having the asymmetrical bat-wing candle power distribution. The light adjusting device includes an opening and the light adjusting device is configured to adjust the light rays through the opening to form an illumination region having a preset shape by adjusting a geometric shape of the opening corresponding to the lens having the asymmetrical bat-wing candle power distribution.

13 Claims, 10 Drawing Sheets

PROJECTING LAMP STRUCTURE HAVING LIGHT ADJUSTING DEVICE

CROSS-REFERENCE TO RELATED APPLICATIONS

This application claims the benefits of Taiwan Utility Model Application No. 106205839 filed on Apr. 26, 2017, the contents of which are incorporated herein by reference in their entirety.

BACKGROUND OF THE INVENTION

Field of Invention

The present invention relates to a technical field of a lamp, and more particularly to a projecting lamp structure having a light adjusting device.

Description of Prior Art

Currently, due to a rapid development stage of lamp technology with a light-emitted diode (LED), it has been gradually replaces the conventional lamp. The major difference of the LED lamp and the lamp tube type is that the LED light source of the lamp is emitted by an LED chip, which is a point light source. Due to the characteristics of the point light source in the LED lamp design, how the light sources are reflected, so that the point light source can radiate into uniform light, becomes one of LED lamp design issues.

Conventional projecting lamp has circular distribution of light emitting illumination region, and the illumination region is located directly below the lamp to form an intermediate brighter non-uniform state. For example, it is not easy to control the shape and size of the illumination region. In other words, the illumination region is only an area of the circular shape. When a distance between the projection lamp and the illumination region is increased, the lamp illuminance is inversely proportional to the square of the distance to form a non-uniform illuminance distribution. Accordingly, there is a need to develop a new type of a projection lamp to solve the aforementioned problems of inconvenient shape adjustment and non-uniform distribution of light in the illumination region.

SUMMARY OF THE INVENTION

Therefore, one objective of the present invention is to provide a projecting lamp structure having a light adjusting device so that the light adjusting device adjusts a light distribution shape of an illumination region and lens having an asymmetrical bat-wing candle power distribution is configured to uniform distribution of the light rays.

Based on the above objective, the present invention sets forth the projecting lamp structure having the light adjusting device. The projecting lamp structure includes a light source disposed on a circuit board and configured to provide light rays; a lens having an asymmetrical bat-wing candle power distribution disposed on the circuit board, wherein the lens is configured to receive the light rays and emits the light rays; and a light adjusting device disposed on the circuit board and surrounding the lens having the asymmetrical bat-wing candle power distribution, wherein the light adjusting device includes an opening and the light adjusting device is configured to adjust the light rays through the opening to form an illumination region having a preset shape by adjusting a geometric shape of the opening corresponding to the lens having the asymmetrical bat-wing candle power distribution.

In one embodiment, the lens having the asymmetrical bat-wing candle power distribution includes a substrate; a main body disposed on the substrate and forming a recess from a bottom portion of the main body, wherein the recess defines a light incident surface so that the light rays are emitted to the light incident surface, and an outer surface of the main body defines a first light-emitting surface so that the light rays through the light incident surface are emitted to the first light-emitting surface, where the first light-emitting surface corresponds to the opening; a first shielding body disposed on the substrate and adjacent to a sidewall of the main body, wherein the first light-emitting surface adjoins to a first sidewall of the first shielding body near the sidewall of the main body, the first shielding body forms a reflection surface which is adjacent to the light incident surface to reflect the light rays to the first light-emitting surface, where the first shielding body corresponds a first shading portion of the light adjusting device; and a second shielding body disposed on the substrate and adjacent to another sidewall of the main body, the second shielding body opposite the first shielding body, wherein the first light-emitting surface adjoins to a second sidewall of the second shielding body near the another sidewall of the main body, where the second shielding body corresponds a second shading portion of the light adjusting device.

In one embodiment, the light adjusting device further includes a surrounding portion disposed on the circuit board and surrounding the lens having the asymmetrical bat-wing candle power distribution to shade the light rays that passes through the lens having the asymmetrical bat-wing candle power distribution.

In one embodiment, the light adjusting device further includes a first shading portion connected to the surrounding portion for shading a portion of the light rays.

In one embodiment, the light adjusting device further includes a second shading portion connected to the surrounding portion and the first shading portion for shading a portion of the light rays; a third shading portion connected to the surrounding portion and the second shading portion, wherein the third shading portion is arranged opposite the first shading portion; and a fourth shading portion connected to the surrounding portion, the third shading portion and the first shading portion, wherein the fourth shading portion is arranged opposite the second shading portion or shading a portion of the light rays; wherein the first shading portion, the second shading portion, the third shading portion, and the fourth shading portion are connected each other to form the opening.

In one embodiment, a distance between the first shielding body and the first shading portion is less than a distance between the second shielding body and the second shading portion.

In one embodiment, a length-to-width ratio of the illumination region is selected from one group consisting of 3:4, 1:1 and 4:3.

In one embodiment, a material of the lens having the asymmetrical bat-wing candle power distribution is selected from one group consisting of poly ethylene terephthalate (PET), polyurethane (PU), polycarbonate (PC), polypropylene (PP), polymethyl methacrylate (PMMA), glass and a silicon material.

In one embodiment, the light source includes at least one LED light source.

The present invention further provides a projecting lamp structure. The projecting lamp structure includes a light source disposed on a circuit board and configured to provide light rays; a lens having an asymmetrical bat-wing candle power distribution disposed on the circuit board, wherein the lens is configured to receive the light rays and emits the light rays; and a light adjusting device disposed on the circuit board and surrounding the lens having the asymmetrical bat-wing candle power distribution, wherein the light adjusting device includes an opening and the light adjusting device is configured to adjust the light rays through the opening to form an illumination region having a preset shape by adjusting a geometric shape of the opening corresponding to the lens having the asymmetrical bat-wing candle power distribution, wherein the light adjusting device further includes a first shading portion connected to the surrounding portion for shading a portion of the light rays; a second shading portion connected to the surrounding portion and the first shading portion for shading a portion of the light rays; a third shading portion connected to the surrounding portion and the second shading portion, wherein the third shading portion is arranged opposite the first shading portion; and a fourth shading portion connected to the surrounding portion, the third shading portion and the first shading portion, wherein the fourth shading portion is arranged opposite the second shading portion or shading a portion of the light rays; wherein the first shading portion, the second shading portion, the third shading portion, and the fourth shading portion are connected each other to form the opening.

In one embodiment, the lens having the asymmetrical bat-wing candle power distribution includes a substrate; a main body disposed on the substrate and forming a recess from a bottom portion of the main body, wherein the recess defines a light incident surface so that the light rays are emitted to the light incident surface, and an outer surface of the main body defines a first light-emitting surface so that the light rays through the light incident surface are emitted to the first light-emitting surface, where the first light-emitting surface corresponds to the opening; a first shielding body disposed on the substrate and adjacent to a sidewall of the main body, wherein the first light-emitting surface adjoins to a first sidewall of the first shielding body near the sidewall of the main body, the first shielding body forms a reflection surface which is adjacent to the light incident surface to reflect the light rays to the first light-emitting surface, where the first shielding body corresponds a first shading portion of the light adjusting device; and a second shielding body disposed on the substrate and adjacent to another sidewall of the main body, the second shielding body opposite the first shielding body, wherein the first light-emitting surface adjoins to a second sidewall of the second shielding body near the another sidewall of the main body, where the second shielding body corresponds a second shading portion of the light adjusting device.

In one embodiment, the light adjusting device further includes a surrounding portion disposed on the circuit board and surrounding the lens having the asymmetrical bat-wing candle power distribution to shade the light rays that passes through the lens having the asymmetrical bat-wing candle power distribution.

In one embodiment, a distance between the first shielding body and the first shading portion is less than a distance between the second shielding body and the second shading portion.

In one embodiment, a length-to-width ratio of the illumination region is selected from one group consisting of 3:4, 1:1 and 4:3.

In one embodiment, a material of the lens having the asymmetrical bat-wing candle power distribution is selected from one group consisting of poly ethylene terephthalate (PET), polyurethane (PU), polycarbonate (PC), polypropylene (PP), polymethyl methacrylate (PMMA), glass and a silicon material.

In one embodiment, the light source includes at least one LED light source.

BRIEF DESCRIPTION OF THE DRAWINGS

The following embodiments refer to the accompanying drawings for exemplifying specific implementable embodiments of the present invention.

DETAILED DESCRIPTION OF THE PREFERRED EMBODIMENTS

Figure 1:
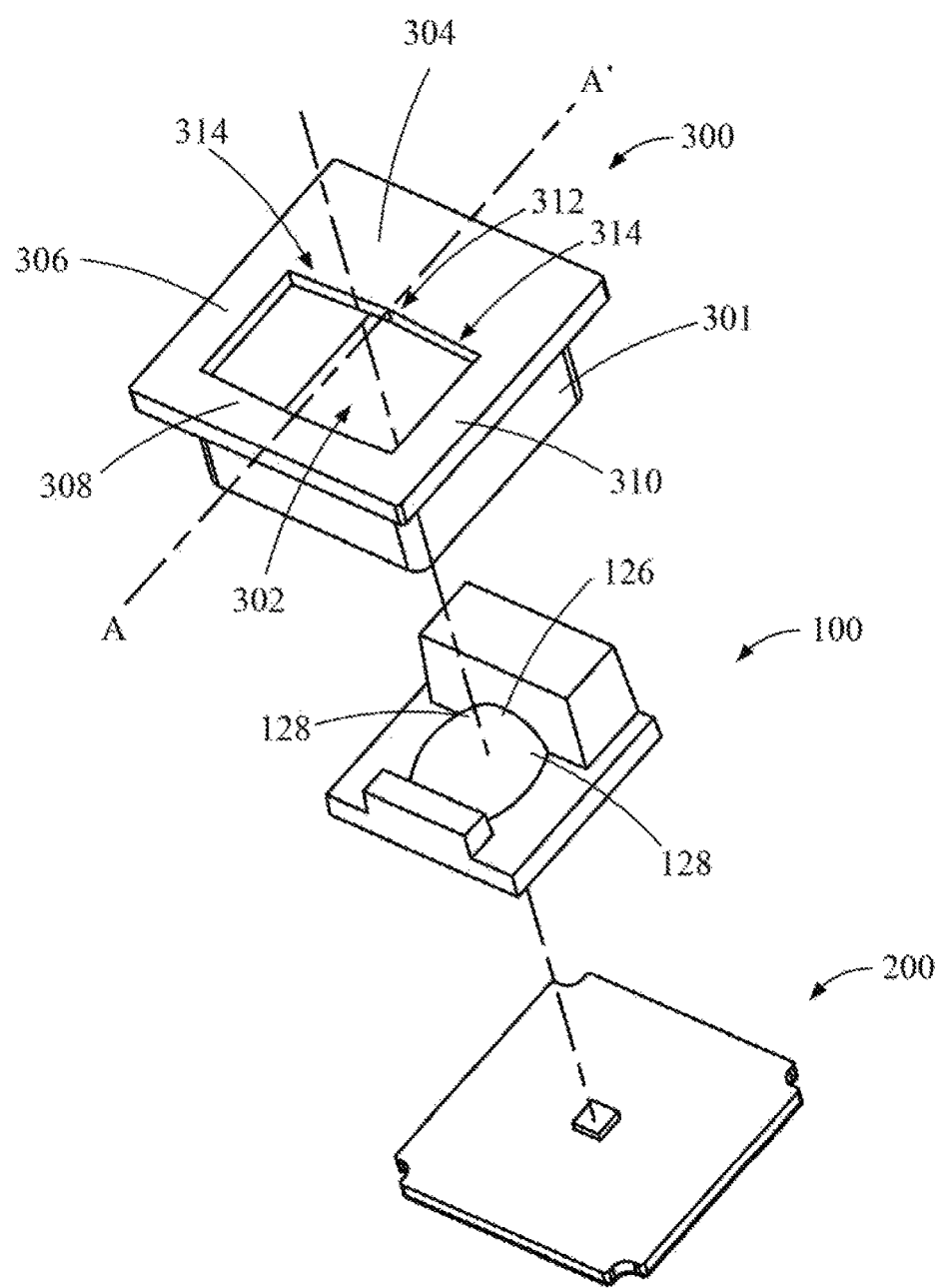
FIG. 1 is an illustrative exploded diagram of a projecting lamp structure having a light adjusting device according to a first embodiment of the present invention.

The following embodiments refer to the accompanying drawings for exemplifying specific implementable embodiments of the present invention. Furthermore, directional terms described by the present invention, such as upper, lower, front, back, left, right, inner, outer, side, etc., are only directions by referring to the accompanying drawings, and thus the used directional terms are used to describe and understand the present invention, but the present invention is not limited thereto. In the drawings, the same reference symbol represents the same or a similar component.

Figure 2:
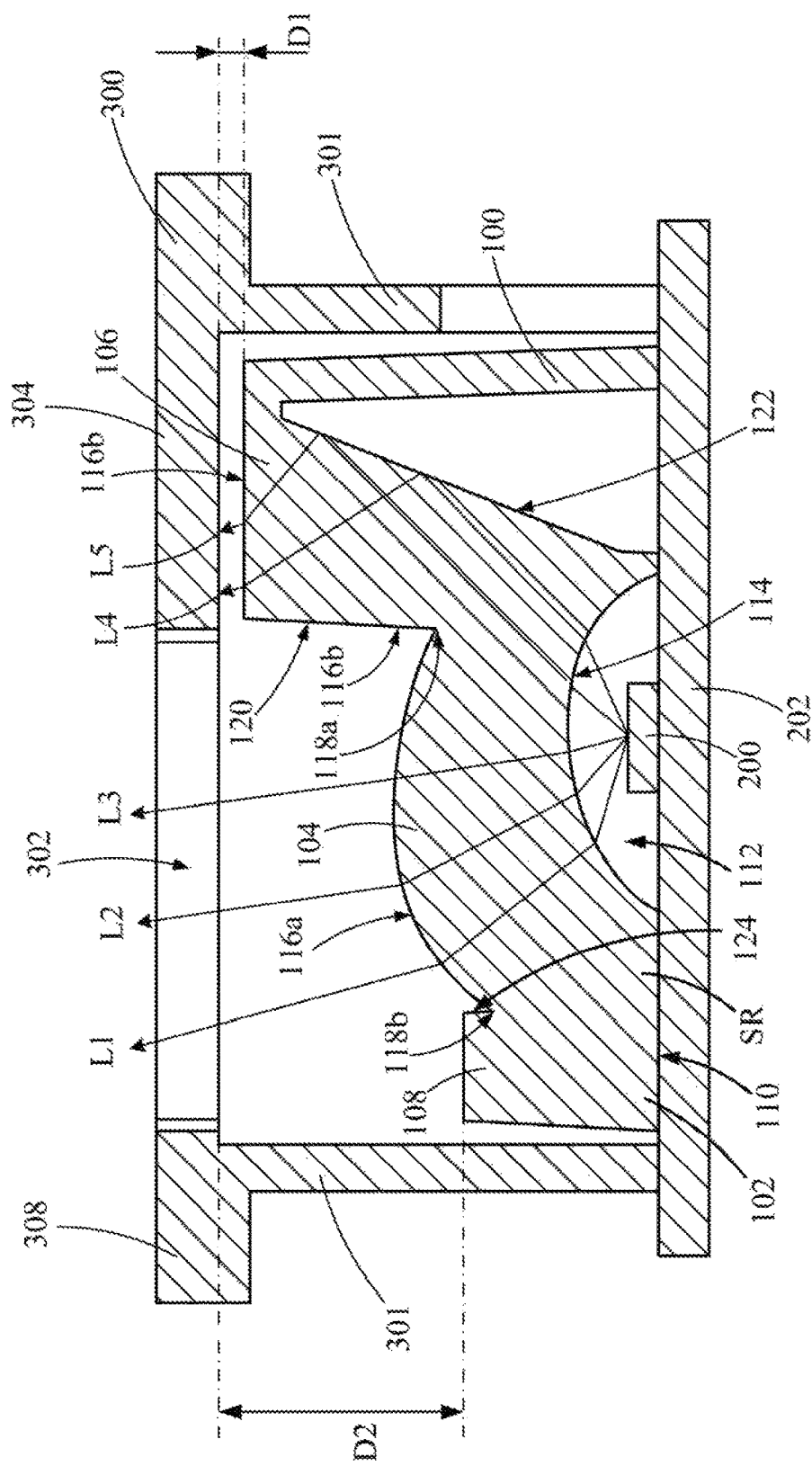
FIG. 2 is an illustrative cross-sectional diagram of the projecting lamp structure along line A-A' shown in FIG. 1 according to the first embodiment of the present invention.

FIG. 1 is an illustrative exploded diagram of a projecting lamp structure having a light adjusting device according to a first embodiment of the present invention. FIG. 2 is an illustrative cross-sectional diagram of the projecting lamp structure along line A-A' shown in FIG. 1 according to the first embodiment of the present invention. As shown in FIG.

1, the projecting lamp structure includes a lens 100 having an asymmetrical bat-wing candle power distribution, a light source 200, and a light adjusting device 300. The light source 200 is disposed on a circuit board 202 and configured to provide light rays L1, L2, and L3. The light rays L1, L2, and L3 enter the lens 100 having the asymmetrical bat-wing candle power distribution. The light adjusting device 300 adjusts the light rays L1, L2, and L3 so that the light rays L1, L2, and L3 are emitted outside the lens 100 having the asymmetrical bat-wing candle power distribution. The circuit board 202 is configured to switch on or switch off the light source 200. In one embodiment, the light source 200 includes at least one LED light source. As shown in FIG. 1, the light source 200 includes LED light source.

As shown in FIG. 1, the lens 100 having the asymmetrical bat-wing candle power distribution is disposed on the circuit board 202, where the lens 100 is configured to receive the light rays L1, L2 and L3, and emits the light rays L1, L2, and L3. In one embodiment, the lens 100 having the asymmetrical bat-wing candle power distribution is fixed on the circuit board 202. In one embodiment, a material of the lens having the asymmetrical bat-wing candle power distribution is selected from one group consisting of poly ethylene terephthalate (PET), polyurethane (PU), polycarbonate (PC), polypropylene (PP), polymethyl methacrylate (PMMA), glass and a silicon material.

Figure 5A:
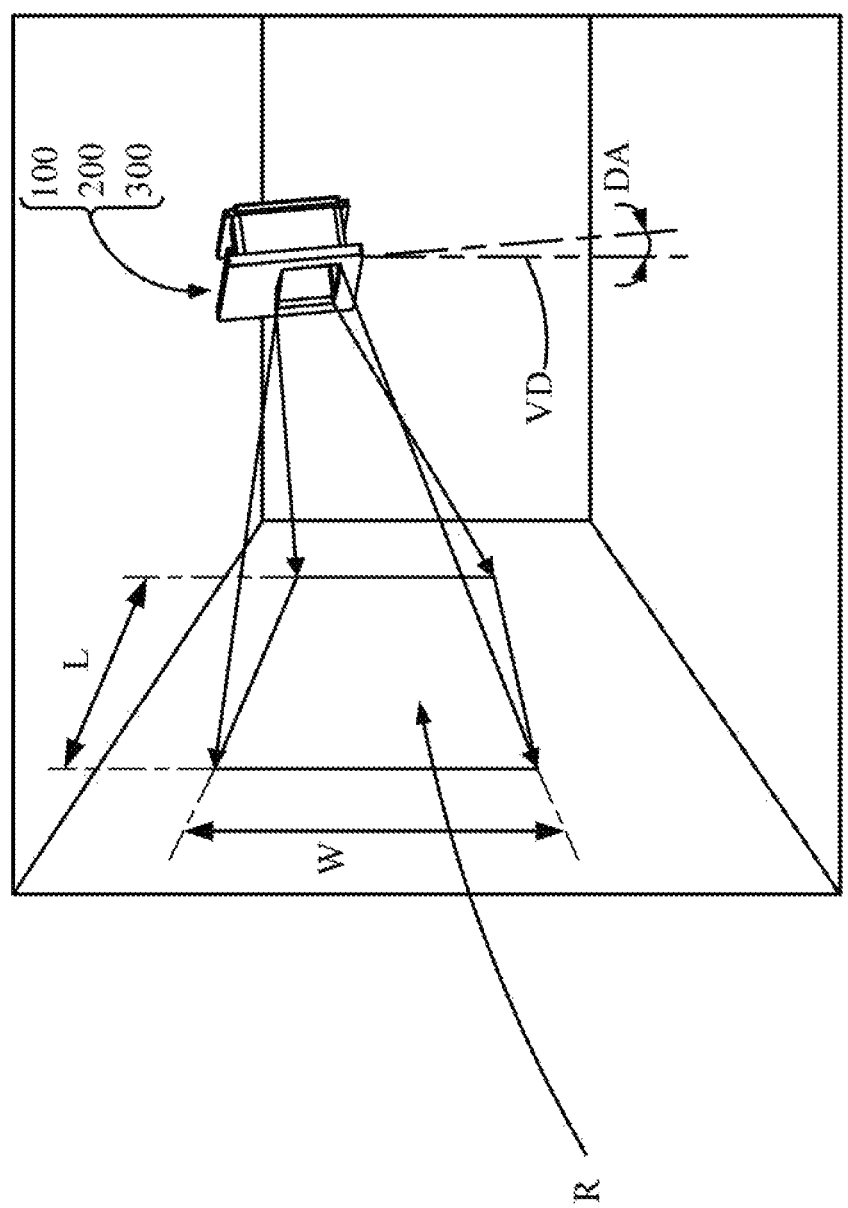
FIG. 5A is an illustrative perspective diagram of the projecting lamp structure having the light adjusting device in an operational arrangement status according to the first embodiment of the present invention.

As shown in FIG. 1, a light adjusting device 300 is disposed on the circuit board 202 and surrounds the lens 100 having the asymmetrical bat-wing candle power distribution. The light adjusting device 300 includes an opening 302 and the light adjusting device 300 is configured to adjust the light rays L1, L2, and L3 through the opening 302 to form an illumination region R (as shown in FIG. 5A) having a preset shape by adjusting a geometric shape of the opening 302 corresponding to the lens 100 having the asymmetrical bat-wing candle power distribution. The illumination region R is an area having different a length-to-width ratios. For example, light adjusting device 300 is fixed on the circuit board 202.

In detail, as shown in FIG. 1 and FIG. 2, the lens 100 having the asymmetrical bat-wing candle power distribution includes a substrate 102, a main body 104, a first shielding body 106, and a second shielding body 108. The main body 104 is disposed on the substrate 104 and forms a recess 112 from a bottom portion 110 of the main body 104. The recess 112 defines a light incident surface 114 so that the light rays L1, L2 and L3, are emitted to the light incident surface 114, and an outer surface of the main body defines a first light-emitting surface 116a so that the light rays L1, L2 and L3 through the light incident surface 114 are emitted to the first light-emitting surface 116a, where the first light-emitting surface 116a corresponds to the opening 302. The first shielding body 106 is disposed on the substrate 102 and adjacent to a sidewall 118a of the main body 104. The first light-emitting surface 116a adjoins to a first sidewall 120 of the first shielding body 106 near the sidewall 118a of the main body 104, the first shielding body 106 forms a reflection surface 122 which is adjacent to the light incident surface 114 to reflect the light rays IA and L5 to the second light-emitting surface 116b, where the first shielding body 106 corresponds a first shading portion 304 of the light adjusting device 300. For example, the light rays L4 and L5 are dispersive light. The second shielding body 108 is disposed on the substrate 102 and is adjacent to another sidewall 118b of the main body 104. The second shielding body 108 opposite the first shielding body 106, where the first light-emitting surface 116a adjoins to a second sidewall 124 of the second shielding body 108 near the another sidewall of the main body 104, where the second shielding body 108 corresponds a second shading portion 306 of the light adjusting device 300.

As shown in FIG. 1 and FIG. 2, the light adjusting device further includes a surrounding portion 301, a first shading portion 304, a second shading portion 306, a third shading portion 308, and a fourth shading portion 310. The surrounding portion 301 is disposed on the circuit board 202 and surrounds the lens 100 having the asymmetrical bat-wing candle power distribution to shade the light rays L4 and L5 that passes through the lens 100 having the asymmetrical bat-wing candle power distribution. The first shading portion 304 is connected to the surrounding portion 301 for shading a portion of the light rays L4 and L5. The second shading portion 306 is connected to the surrounding portion 301 and the first shading portion 304 for shading a portion of the light rays. The second shading portion 306 is disposed above the main body 104 for shading a portion of the light rays L1, L2 and L3. The third shading portion 308 is connected to the surrounding portion 301 and the second shading portion 306, where the third shading portion 308 is disposed above the second shielding body 108 and is arranged opposite the first shading portion 304. The fourth shading portion 310 is connected to the surrounding portion 301, the third shading portion 308 and the first shading portion 304. The fourth shading portion 310 is arranged opposite the second shading portion 306 for shading a portion of the light rays L1, L2 and L3. The first shading portion 302, the second shading portion 304, the third shading portion 306, and the fourth shading portion 310 are connected each other to form the opening 302.

In one embodiment, as shown in FIG. 1 and FIG. 2, a first distance D1 between the first shielding body 106 and the first shading portion 304 is less than a second distance D2 between the second shielding body 108 and the third shading portion 308. Since the first distance D1 between the first shielding body 106 and the first shading portion 304 is smaller, the light rays L4 and L5 can be shaded. Since the second distance D2 between the second shielding body 108 and the third shading portion 308 is greater, the light rays L1, L2 and L3 can pass through the opening 203 via the second shielding body 108.

Figure 6A:
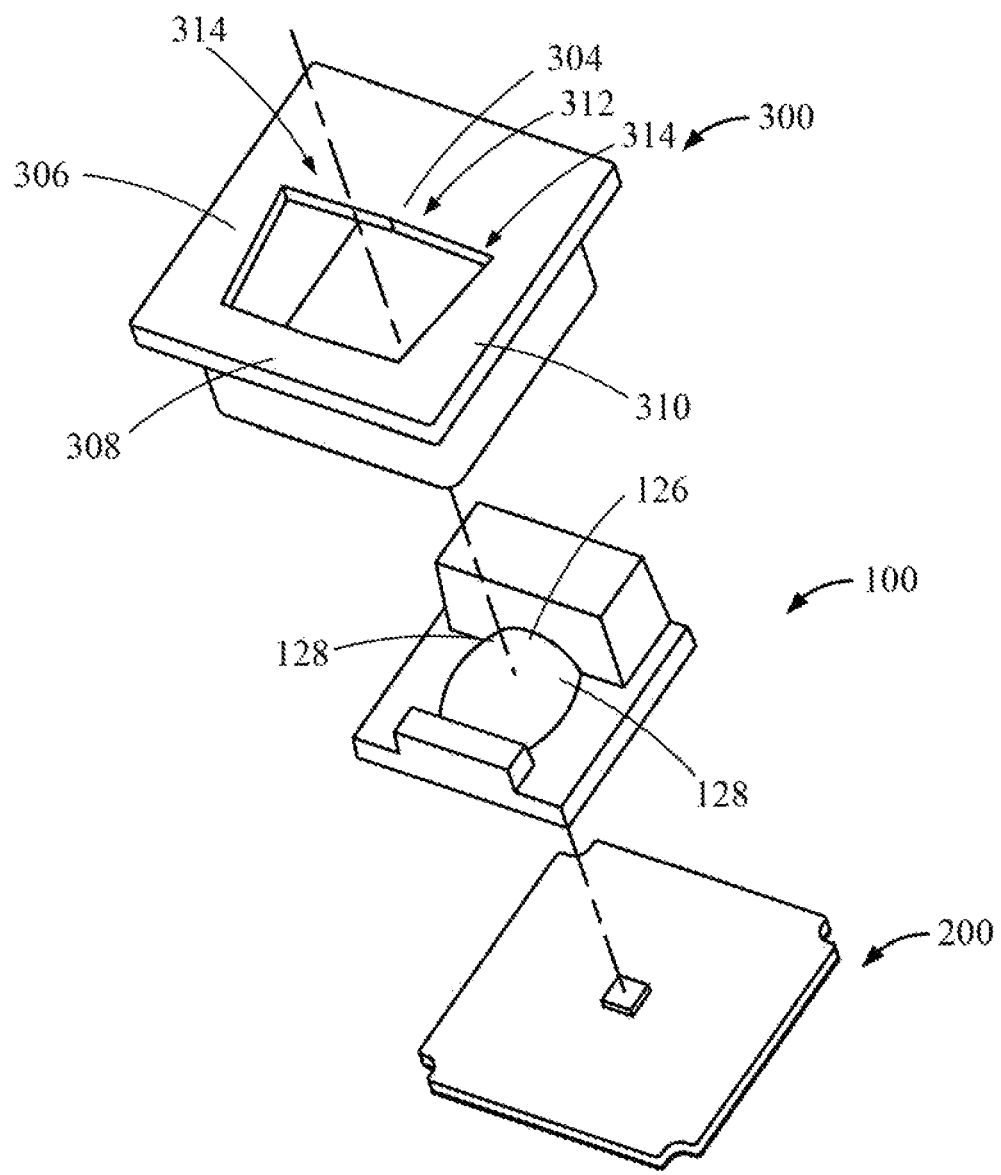
FIG. 6A is an illustrative exploded diagram of a projecting lamp structure having a light adjusting device according to a second embodiment of the present invention.
Figure 7A:
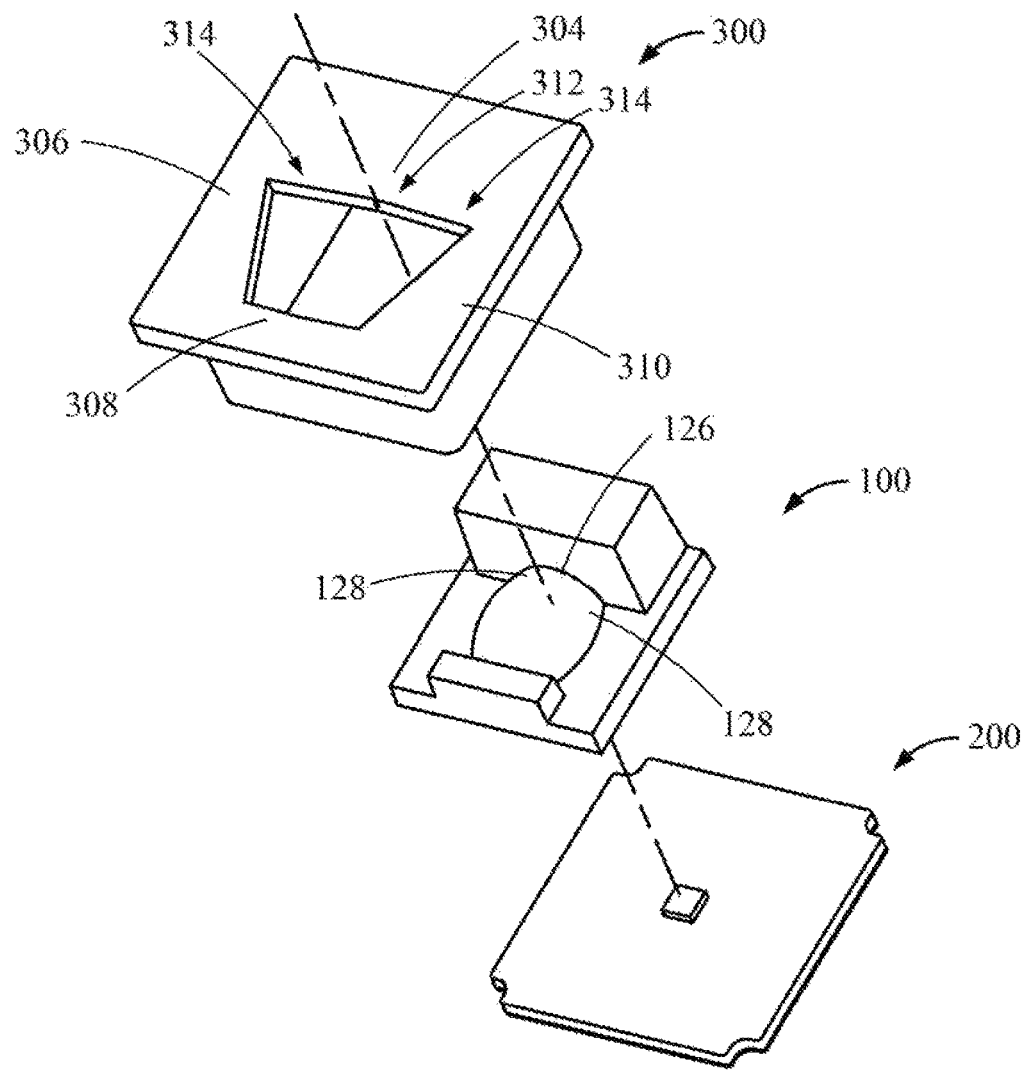
FIG. 7A is an illustrative exploded diagram of a projecting lamp structure having a light adjusting device according to a third embodiment of the present invention.

A length-to-width ratio of the region R is configured to adjust the shape and length of the first shading portion 304, the second shading portion 306, the third shading portion 308, and the fourth shading portion 310 to modify the size of the opening 302. In the present invention, the projecting lamp structure having the light adjusting device 300 adjusts the first shading portion 304, the second shading portion 306, the third shading portion 308, and the fourth shading portion 310 to modify the length-to-width ratio of the region R. As shown in FIG. 1, for example, the first shading portion 304 includes a V-shape, where a concave portion in a middle portion 312 of the v-shape corresponds to the upper portion 126 of the lens 100, and a convex portion in later sides 314 of the V-shape corresponds to lateral portions 128 of the lens 100. Therefore, the first shading portion 304 can be modified based on the lens 100. Similarly, the third shading portion 308 can be modified based on the lens 100. FIG. 6A and FIG. 7A also includes the above-mentioned features.

Figure 3:
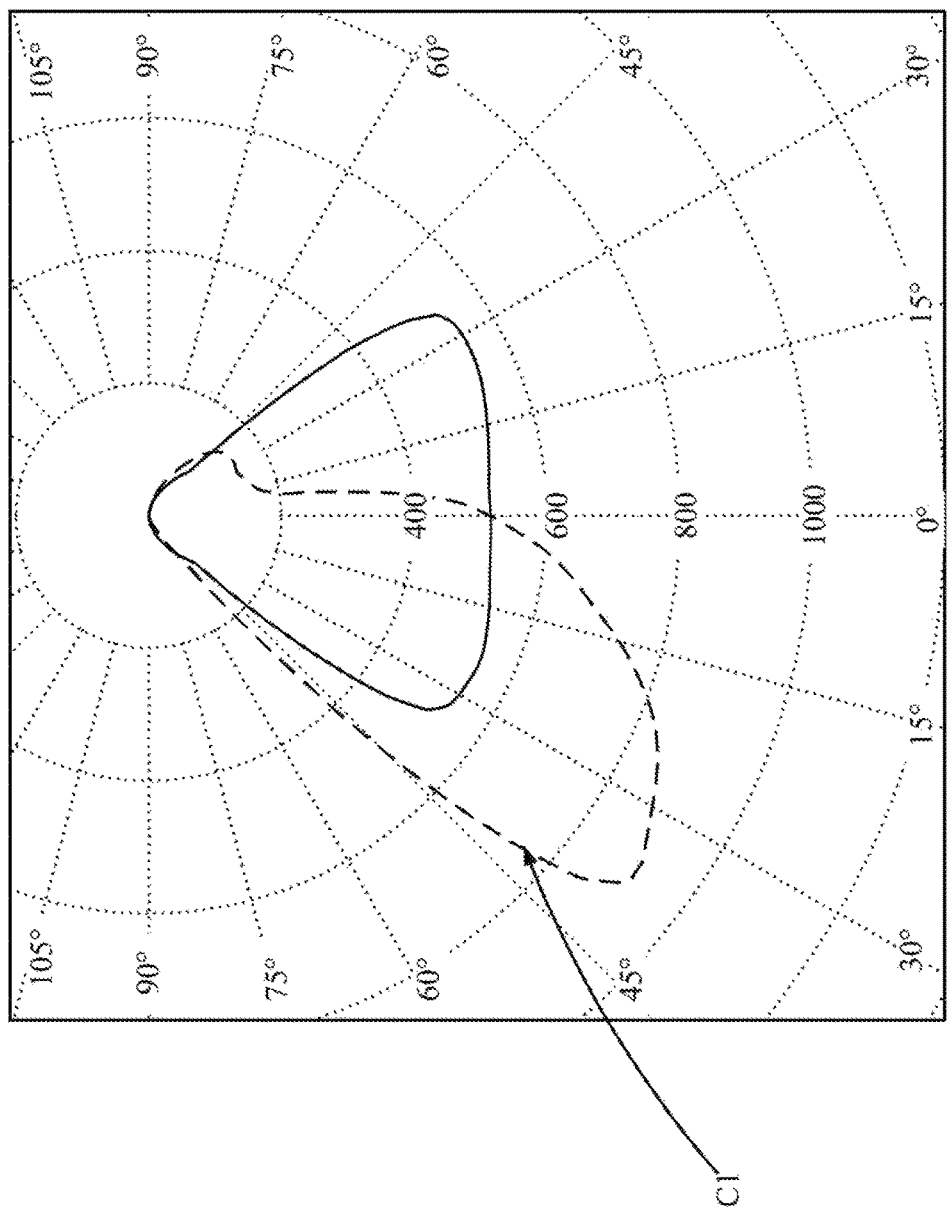
FIG. 3 is an illustrative waveform diagram of a candle power distribution of the projecting lamp structure having the light adjusting device according to the first embodiment of the present invention.
Figure 4:
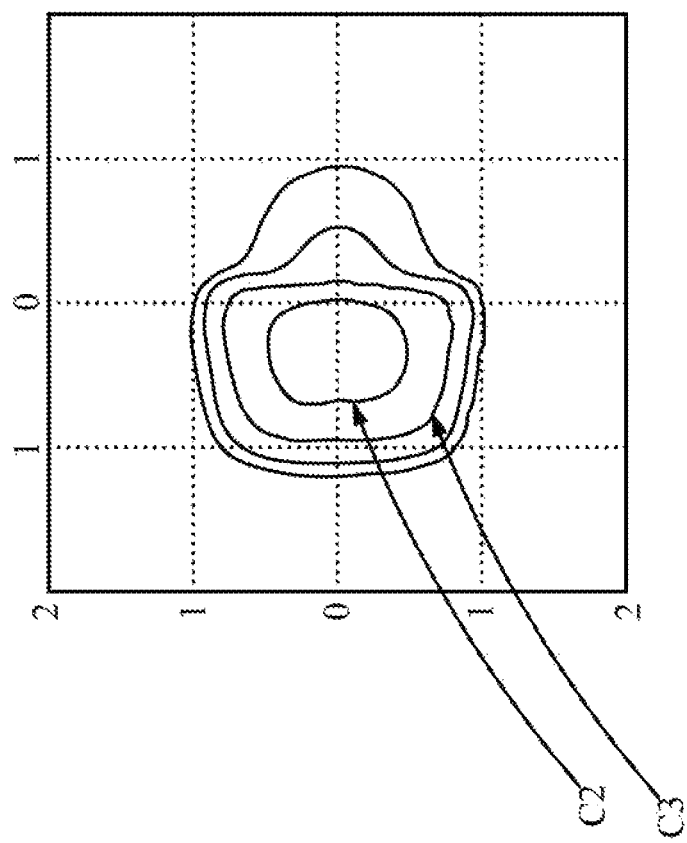
FIG. 4 is an illustrative equalization illuminance diagram of the projecting lamp structure having the light adjusting device according to the first embodiment of the present invention.

FIG. 3 is an illustrative waveform diagram of a candle power distribution of the projecting lamp structure having the light adjusting device according to the first embodiment of the present invention. FIG. 4 is an illustrative equalization illuminance diagram of the projecting lamp structure having the light adjusting device according to the first embodiment of the present invention. As shown in FIG. 3, candle power distribution C1 is defined as a curve disposed in the cross-sectional SR of the lens 100, where an illuminance angle is between five degrees and sixty degrees which has a wider illuminance area, such as illuminance region R (as shown in FIG. 5A). In other words, the candle power distribution C1 forms a bat-wing candle power distribution so that the light rays focuses on left lower side of the lens 100 to form a rectangular illuminance region. As shown in FIG. 4, the equalization illuminance curves C2 and C3 has a rectangular illuminance region, where a horizontal axis and a vertical axis represent a length unit, such as meter.

Figure 5B:
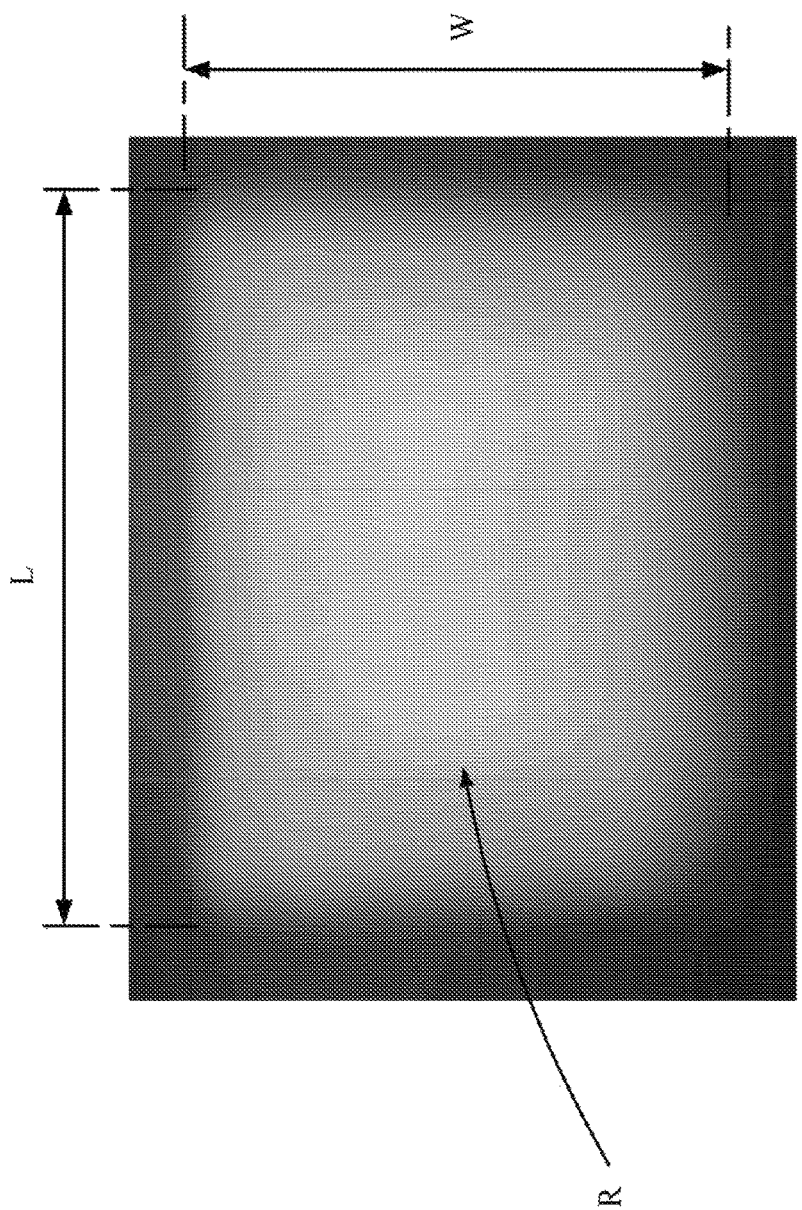
FIG. 5B is an illustrative photograph of the projecting lamp structure having the light adjusting device according to the first embodiment of the present invention.

FIG. 5A is an illustrative perspective diagram of the projecting lamp structure having the light adjusting device in an operational arrangement status according to the first embodiment of the present invention. FIG. 5B is an illustrative photograph of the projecting lamp structure having the light adjusting device according to the first embodiment of the present invention. In the present invention, the lens 100 forms a bat-wing candle power distribution profile and the light adjusting device 300 is configured to converge the light rays L1, L2 and L3 on the wall 204 so that the light rays L1, L2 and L3 are projected on the wall 204 to form the illuminance region R (i.e., rectangular illuminance region). A length of the illuminance region R is defined as L and a width of the illuminance region R is defined as W so that the light adjusting device 300 can adjust the length L and the width W of the illuminance region R. For example, the first shading portion 304 and the third shading portion 308 is configured to adjust the length L, and the second shading portion 306 and the fourth shading portion 310 adjusts the width W. In one embodiment, a length-to-width ratio of the illumination region is selected from one group consisting of 3:4, 1:1 and 4:3. In one case, a length-to-width ratio of the illumination region is 4:3. An inclined angle between a surface formed by the first shading portion 304, the second shading portion 306, the third shading portion 308, and the fourth shading portion 310 and a vertical direction VD is adjustable, where the inclined angle is eight degrees, for example.

Figure 6B:
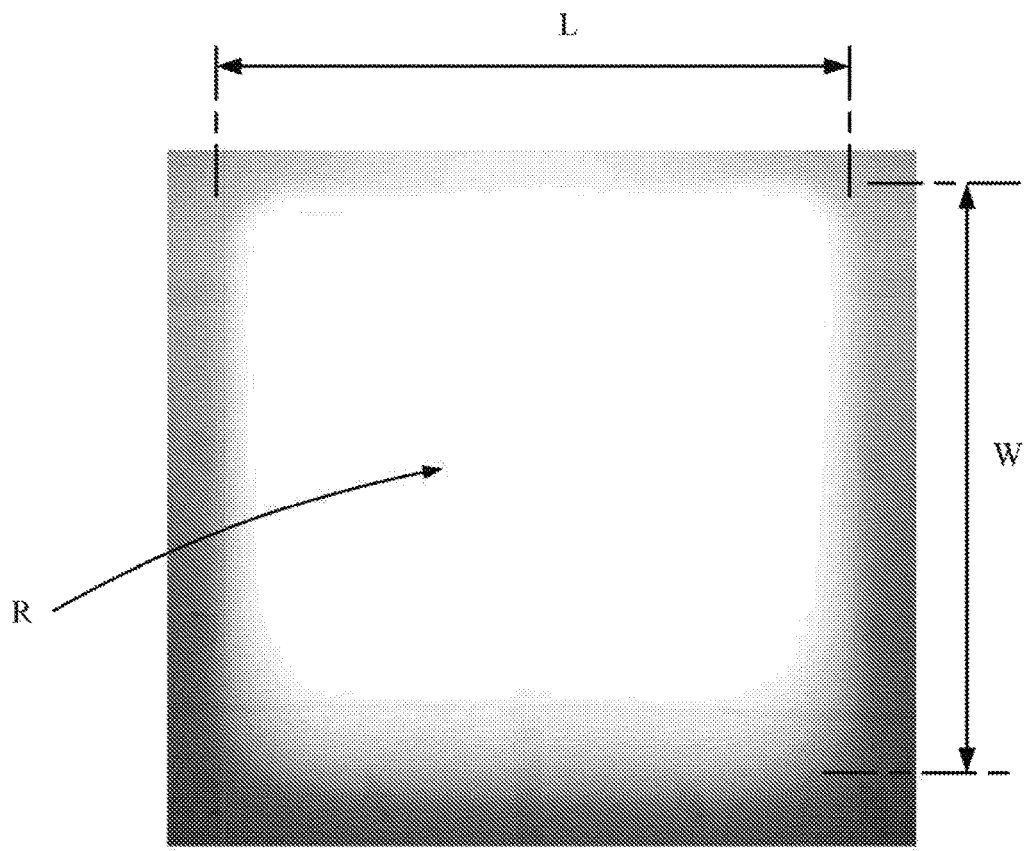
FIG. 6B is an illustrative photograph of the projecting lamp structure having the light adjusting device according to the second embodiment of the present invention.

FIG. 6A is an illustrative exploded diagram of a projecting lamp structure having a light adjusting device according to a second embodiment of the present invention. FIG. 6B is an illustrative photograph of the projecting lamp structure having the light adjusting device according to the second embodiment of the present invention. As shown in FIG. 6A and FIG. 6B, the lens in the second embodiment is similar to the lens in the first embodiment. The difference is that lens in the second embodiment can shade more light rays L1, L2 and L3 to adjust a length-to-width ratio of the illumination region R. In one case, a length-to-width ratio of the illumination region is 1:1. An inclined angle between a surface formed by the first shading portion 304, the second shading portion 306, the third shading portion 308, and the fourth shading portion 310 and a vertical direction VD is adjustable, so that a length-to-width ratio of the illumination region is 1:1, where the inclined angle is seventeen degrees, for example.

Figure 7B:
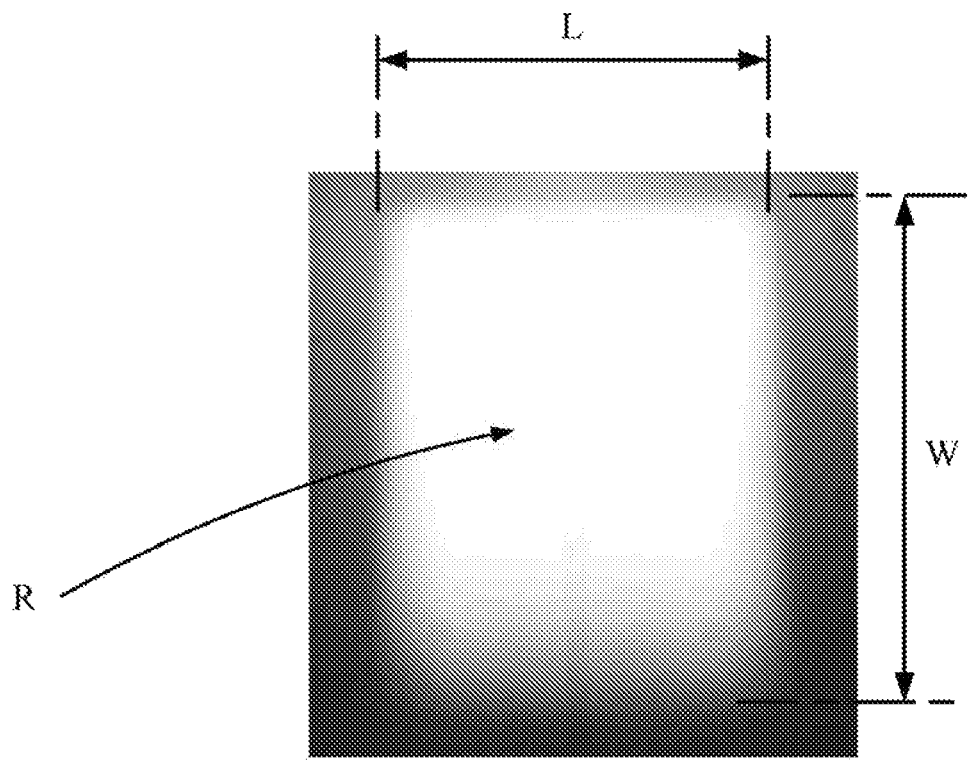
FIG. 7B is an illustrative photograph of the projecting lamp structure having the light adjusting device according to the third embodiment of the present invention.

FIG. 7A is an illustrative exploded diagram of a projecting lamp structure having a light adjusting device according to a third embodiment of the present invention. FIG. 7B is an illustrative photograph of the projecting lamp structure having the light adjusting device according to the third embodiment of the present invention. As shown in FIG. 7A and FIG. 7B, the lens in the third embodiment is similar to the lens in the first embodiment. The difference is that lens in the third embodiment can shade more light rays L1, L2 and L3 to adjust a length-to-width ratio of the illumination region R. In one case, a length-to-width ratio of the illumination region is 3:4. An inclined angle between a surface formed by the first shading portion 304, the second shading portion 306, the third shading portion 308, and the fourth shading portion 310 and a vertical direction VD is adjustable, so that a length-to-width ratio of the illumination region is 3:4, where the inclined angle is twenty-five degrees, for example.

As is understood by a person skilled in the art, the foregoing preferred embodiments of the present invention are illustrative rather than limiting of the present invention. It is intended that they cover various modifications and similar arrangements be included within the spirit and scope of the present invention, the scope of which should be accorded the broadest interpretation so as to encompass all such modifications and similar structures.

What is claimed is:

1. A projecting lamp structure, comprising:
   a light source disposed on a circuit board and configured to provide light rays;
   a lens having an asymmetrical bat-wing candle power distribution disposed on the circuit board, wherein the lens is configured to receive the light rays and emits the light rays; and
   a light adjusting device disposed on the circuit board and surrounding the lens having the asymmetrical bat-wing candle power distribution, wherein the light adjusting device comprises an opening and the light adjusting device is configured to adjust the light rays through the opening to form an illumination region having a preset shape by adjusting a geometric shape of the opening corresponding to the lens having the asymmetrical bat-wing candle power distribution;
   wherein the light adjusting device further comprises a surrounding portion disposed on the circuit board and surrounding the lens having the asymmetrical bat-wing candle power distribution to shade the light rays that passes through the lens having the asymmetrical bat-wing candle power distribution;
   wherein the light adjusting device further comprises a first shading portion connected to the surrounding portion for shading a portion of the light rays;
   wherein the light adjusting device further comprises:
   a second shading portion connected to the surrounding portion and the first shading portion for shading a portion of the light rays;
   a third shading portion connected to the surrounding portion and the second shading portion, wherein the third shading portion is arranged opposite the first shading portion; and
   a fourth shading portion connected to the surrounding portion, the third shading portion and the first shading portion, wherein the fourth shading portion is arranged opposite the second shading portion for shading a portion of the light rays;
   wherein the first shading portion, the second shading portion, the third shading portion, and the fourth shading portion are connected each other to form the opening.

2. The projecting lamp structure according to claim 1, wherein the lens having the asymmetrical bat-wing candle power distribution comprises:
   a substrate;
   a main body disposed on the substrate and forming a recess from a bottom portion of the main body, wherein the recess defines a light incident surface so that the light rays are emitted to the light incident surface, and an outer surface of the main body defines a first light-emitting surface so that the light rays through the light incident surface are emitted to the first light-emitting surface, where the first light-emitting surface corresponds to the opening;

a first shielding body disposed on the substrate and adjacent to a sidewall of the main body, wherein the first light-emitting surface adjoins to a first sidewall of the first shielding body near the sidewall of the main body, the first shielding body forms a reflection surface which is adjacent to the light incident surface to reflect the light rays to a second light-emitting surface, where the first shielding body corresponds a first shading portion of the light adjusting device; and a second shielding body disposed on the substrate and adjacent to another sidewall of the main body, the second shielding body opposite the first shielding body, wherein the first light-emitting surface adjoins to a second sidewall of the second shielding body near the another sidewall of the main body, where the second shielding body corresponds a second shading portion of the light adjusting device;

wherein the light adjusting device further comprises a first shading portion connected to the surrounding portion for shading a portion of the light rays;

wherein the light adjusting device further comprises:

a second shading portion connected to the surrounding portion and the first shading portion for shading a portion of the light rays;

a third shading portion connected to the surrounding portion and the second shading portion, wherein the third shading portion is arranged opposite the first shading portion; and a fourth shading portion connected to the surrounding portion, the third shading portion and the first shading portion, wherein the fourth shading portion is arranged opposite the second shading portion for shading a portion of the light rays;

wherein the first shading portion, the second shading portion, the third shading portion, and the fourth shading portion are connected each other to form the opening.

3. The projecting lamp structure according to claim 1, wherein a distance between the first shielding body and the first shading portion is less than a distance between the second shielding body and the second shading portion.

4. The projecting lamp structure according to claim 1, wherein a length-to-width ratio of the illumination region is selected from one group consisting of 3:4, 1:1 and 4:3.

5. The projecting lamp structure according to claim 1, wherein a material of the lens having the asymmetrical bat-wing candle power distribution is selected from one group consisting of poly ethylene terephthalate (PET), polyurethane (PU), polycarbonate (PC), polypropylene (PP), polymethyl methacrylate (PMMA), glass and a silicon material.

6. The projecting lamp structure according to claim 1, wherein the light source comprises at least one LED light source.

7. A projecting lamp structure, comprising:
a light source disposed on a circuit board and configured to provide light rays;
a lens having an asymmetrical bat-wing candle power distribution disposed on the circuit board, wherein the lens is configured to receive the light rays and emits the light rays; and a light adjusting device disposed on the circuit board and surrounding the lens having the asymmetrical bat-wing candle power distribution, wherein the light adjusting device comprises an opening and the light adjusting device is configured to adjust the light rays through the opening to form an illumination region having a preset shape by adjusting a geometric shape of the opening corresponding to the lens having the asymmetrical bat-wing candle power distribution, wherein the light adjusting device further comprises:

a first shading portion connected to a surrounding portion for shading a portion of the light rays;

a second shading portion connected to the surrounding portion and the first shading portion for shading a portion of the light rays;

a third shading portion connected to the surrounding portion and the second shading portion, wherein the third shading portion is arranged opposite the first shading portion; and a fourth shading portion connected to the surrounding portion, the third shading portion and the first shading portion, wherein the fourth shading portion is arranged opposite the second shading portion for shading a portion of the light rays;

wherein the first shading portion, the second shading portion, the third shading portion, and the fourth shading portion are connected each other to form the opening.

8. The projecting lamp structure according to claim 7, wherein the lens having the asymmetrical bat-wing candle power distribution comprises:

a substrate;

a main body disposed on the substrate and forming a recess from a bottom portion of the main body, wherein the recess defines a light incident surface so that the light rays are emitted to the light incident surface, and an outer surface of the main body defines a first light-emitting surface so that the light rays through the light incident surface are emitted to the first light-emitting surface, where the first light-emitting surface corresponds to the opening;

a first shielding body disposed on the substrate and adjacent to a sidewall of the main body, wherein the first light-emitting surface adjoins to a first sidewall of the first shielding body near the sidewall of the main body, the first shielding body forms a reflection surface which is adjacent to the light incident surface to reflect the light rays to the first light-emitting surface, where the first shielding body corresponds a first shading portion of the light adjusting device; and a second shielding body disposed on the substrate and adjacent to another sidewall of the main body, the second shielding body opposite the first shielding body, wherein the first light-emitting surface adjoins to a second sidewall of the second shielding body near the another sidewall of the main body, where the second shielding body corresponds a second shading portion of the light adjusting device.

9. The projecting lamp structure according to claim 7, wherein the light adjusting device further comprises a surrounding portion disposed on the circuit board and surrounding the lens having the asymmetrical bat-wing candle power distribution to shade the light rays that passes through the lens having the asymmetrical bat-wing candle power distribution.

10. The projecting lamp structure according to claim 7, wherein a distance between the first shielding body and the first shading portion is less than a distance between the second shielding body and the second shading portion.

11. The projecting lamp structure according to claim 7, wherein a length-to-width ratio of the illumination region is selected from one group consisting of 3:4, 1:1 and 4:3.

12. The projecting lamp structure according to claim 7, wherein a material of the lens having the asymmetrical bat-wing candle power distribution is selected from one group consisting of poly ethylene terephthalate (PET), polyurethane (PU), polycarbonate (PC), polypropylene (PP), polymethyl methacrylate (PMMA), glass and a silicon material.

13. The projecting lamp structure according to claim 7, wherein the light source comprises at least one LED light source.

* * * * *